Sept. 19, 1967    A. P. VOGEL ETAL    3,342,288
VEHICLE
Filed Nov. 23, 1965    4 Sheets-Sheet 1
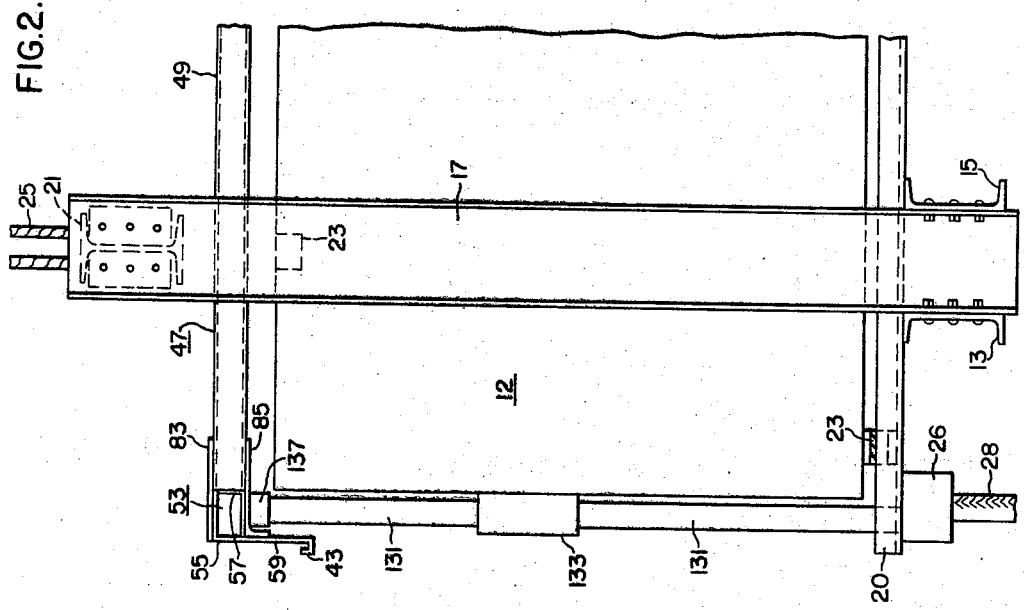
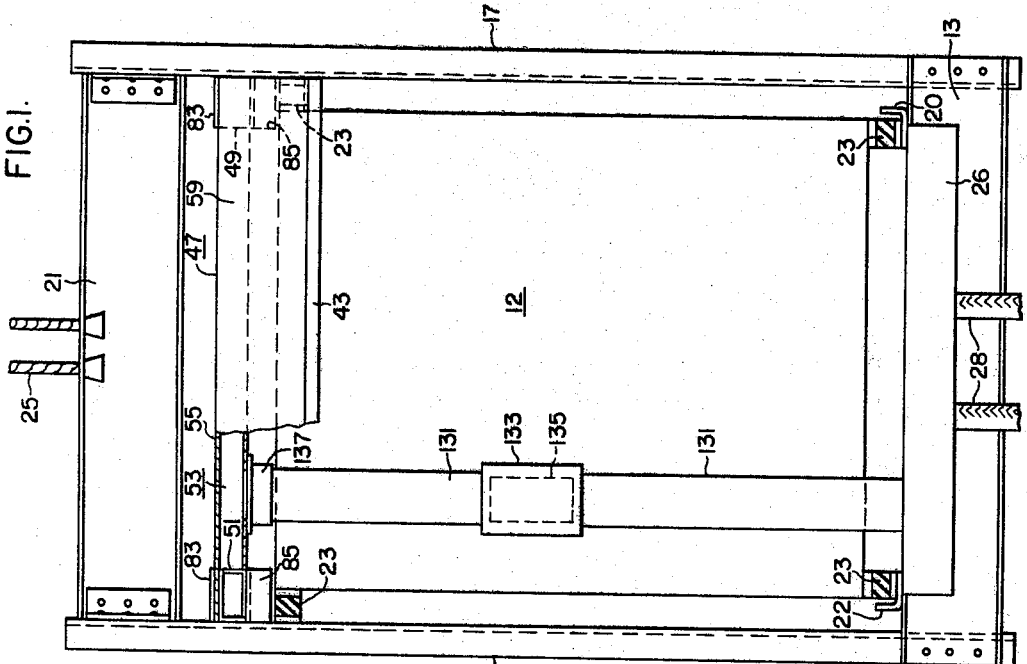
WITNESSES
Theodore F. Wrobel
James F. Young
INVENTORS
Arthur P. Vogel
and Harry Berkovitz
BY
Hyman Diamond
ATTORNEY Sept. 19, 1967 A. P. VOGEL ET AL 3,342,288
VEHICLE
Filed Nov. 23, 1965 4 Sheets-Sheet 3

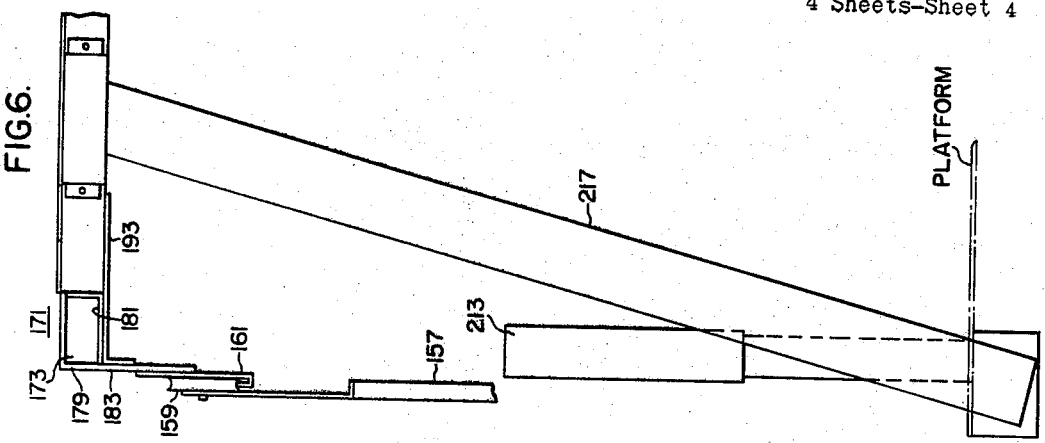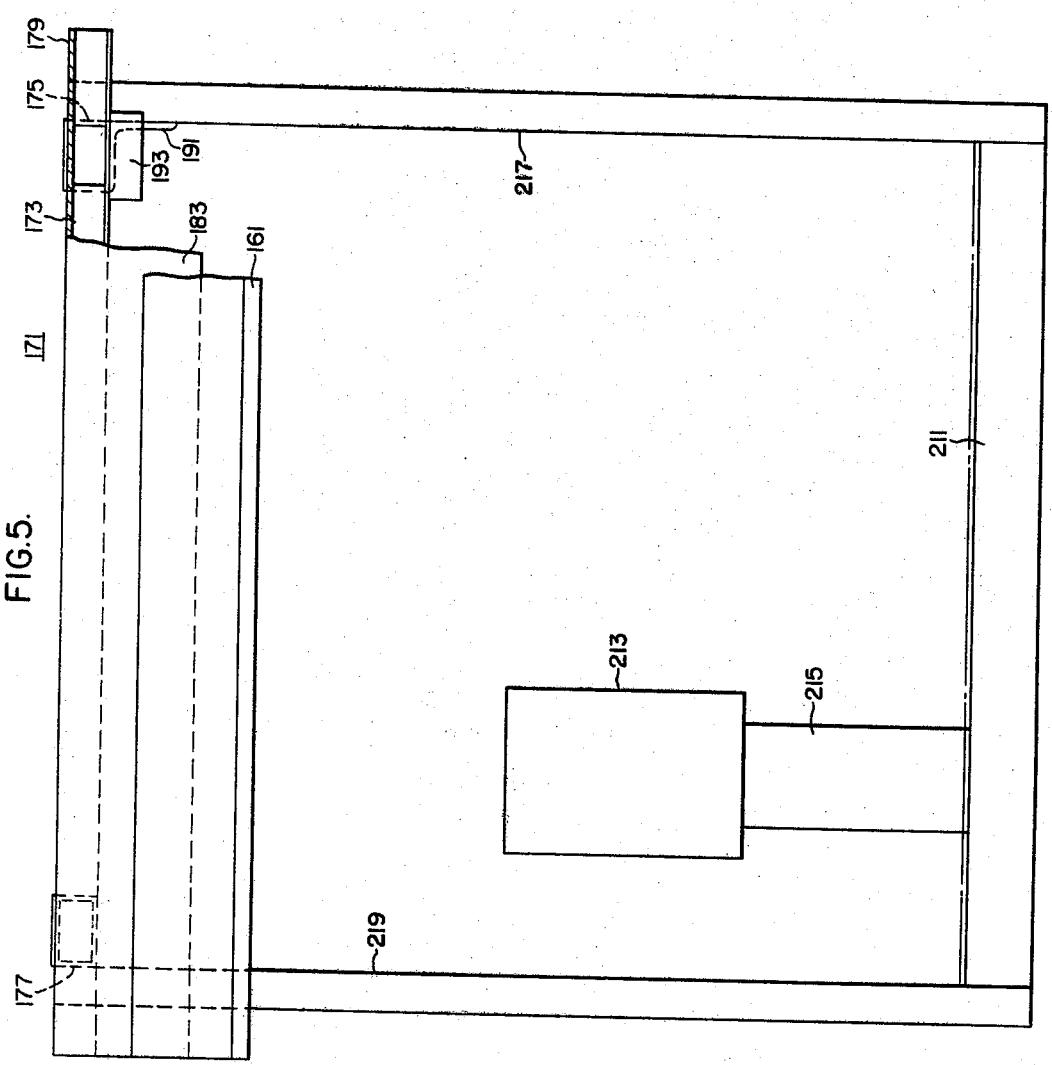

United States Patent Office 3,342,288
Patented Sept. 19, 1967

3,342,288
VEHICLE
Arthur P. Vogel, Martinsville, and Harry Berkovitz, Glen Rock, N.J., assignors to Westinghouse Electric Corporation, Pittsburgh, Pa., a corporation of Pennsylvania
Filed Nov. 23, 1965, Ser. No. 509,295
7 Claims. (Cl. 187—1)

ABSTRACT OF THE DISCLOSURE

A vehicle has a frame, a cab supported by the frame and a duct assembly secured independently to the frame. The cab has a doorway. A door for the doorway is supported by the duct assembly. Various electroresponsive components are mounted on the duct assembly and are connected by wires in the duct assembly.

---

This invention relates to vehicles and has particular relationship to such vehicles as elevator cars. An elevator car has various electrical controlling and operating components in or on the car to which there are electrical connections energized from a supply outside of the car. In producing and installing such a vehicle the problem is presented of appropriately disposing the components in and on the car and mounting the wire or cable connected to these components. This invention is addressed to this problem and its object is to provide an economical and effective solution to this problem. In the interest of concreteness this invention will be described in this application as applied to an elevator car, but it is understood that to the extent that this invention may be applicable to vehicles of other types such application is within the scope of this application.

An elevator car includes a supporting framework of channel beams or the like on which a passenger cab is mounted. The passenger cab is mechanically insulated from the supporting framework by resilient pads, typically of rubber which are interposed between the cab and the framework. The cab has a door usually slidable on a horizontal track which is opened and closed at the various levels at which the car is stopped. The door has an operating mechanism operable by an electric motor and including a linkage or belt drive or other mechanism to open and close the door. The door operating mechanism and the other controlling servicing and operating mechanisms for the car are energized from the cables which are located in the hatch and which are connected to a car-junction box at the base of the car.

In accordance with the teachings of the prior art this door is mounted on a beam secured to the framework of the car. The door operating mechanism with its motor is also mounted on this beam. The various controlling and servicing components for the car including slowdown, leveling and landing switches, interlocks, limit switches and the like, are distributed over the supporting structure of the car. In accordance with the teachings of the prior art the car is provided with a duct system through which the wires to the controlling, servicing and operating mechanisms and from the junction box pass. This duct system includes a vertical duct which extends downwardly externally of the cab from ducts near the upper part of the car to the car-junction box. This vertical duct reduces the clearance available in the hatch between the car and the hatch walls and at times presents a clearance problem.

The above-described prior art support-and-duct system is costly and complex. In addition, it presents a serious installation problem. After the car is constructed and installed in the hatch, the installers have complete freedom to install the conduit in any way that they see fit, and at times the conduit may be installed in inconvenient positions both for the maintenance of the car and for the comfort of the passengers.

It is an object of this invention to overcome the above-described difficulties and to provide a vehicle such as an elevator car having a wiring system of low cost which shall provide for convenient and economic disposition of control, operating and servicing components. Another object of this invention is to provide such a vehicle which shall not include a vertical duct outside of the cab to the car-junction box. A further object of this invention is to provide a duct and door supporting system for an elevator car or the like which shall be capable of being preassembled and wired as an integrated unit for installation in the vehicle and in which the control, operating and servicing components shall be prelocated.

In accordance with this invention the supporting structure for the elevator car door is composed of a plurality of interconnected ducts, including side ducts which are generally perpendicular to the plane of the door and a transverse duct generally parallel to the frame of the door between, and in communication with, the side ducts. The side ducts are supported from the channels which are intermediate the ends of the car and constitute a part of the supporting framework of the car. The transverse duct is supported by the side ducts. The door is carried directly by the transverse duct.

In accordance with an aspect of this invention the walls of the transverse duct are of composite dimensions. The top and front vertical side of the transverse duct are formed of a sheet or strip of metal with the vertical side having a downwardly extending lip from which the door is suspended. The other two sides are formed of a sheet bent at an angle with the edges of the angle abutting the top and front sides respectively. The portion of the duct from which the supporting lip extends is of substantially heavier sheet than the other portion of the duct. Typically, the portion from which the door is suspended may be sheet steel of .109 inch thickness and the other of .075 inch thickness.

The door-operator assembly is mounted on the top of the transverse duct. Since this top is of substantial thickness it is capable of supporting the car operator and the door without being deformed. The other controlling servicing and operating components may be conveniently mounted on the transverse and cross ducts. The connections to these components is effected through openings in the ducts which may be formed by opening knockouts or by removing bolted plates.

In accordance with an important aspect of this invention the connection between the car-junction box through which the power is derived and the transverse and cross ducts is through an additional duct which includes the car station. This additional duct extends through the passenger cab into the transverse duct. The additional duct is so positioned that the car station is conveniently available to the passengers or to an operator. Because the cab is mechanically insulated from the supporting structure of the car, the additional duct is movable relative to the transverse duct where it enters the transverse duct.

Another aspect of this invention relates to a car in which the car station is supported from the base of the cab and is connected to a junction box below the base. In this car the connections between the junction box and the wires in the transverse and cross ducts may be affected through an additional duct typically extending between the junction box and the transverse duct externally of the cab.

For a better understanding of this invention both to its organization and as to its method of operation, together with additional objects and advantages thereof, reference is made to the following description taken in connection with the accompanying drawings, in which:

FIGURE 1 is a view in front elevation of an elevator car in accordance with this invention with the door of the cab removed;

FIG. 2 is a view in side elevation of this car;

FIG. 5 is a view in front elevation of this supporting structure;

FIG. 6 is a view in side elevation of this structure;

Figure 3:
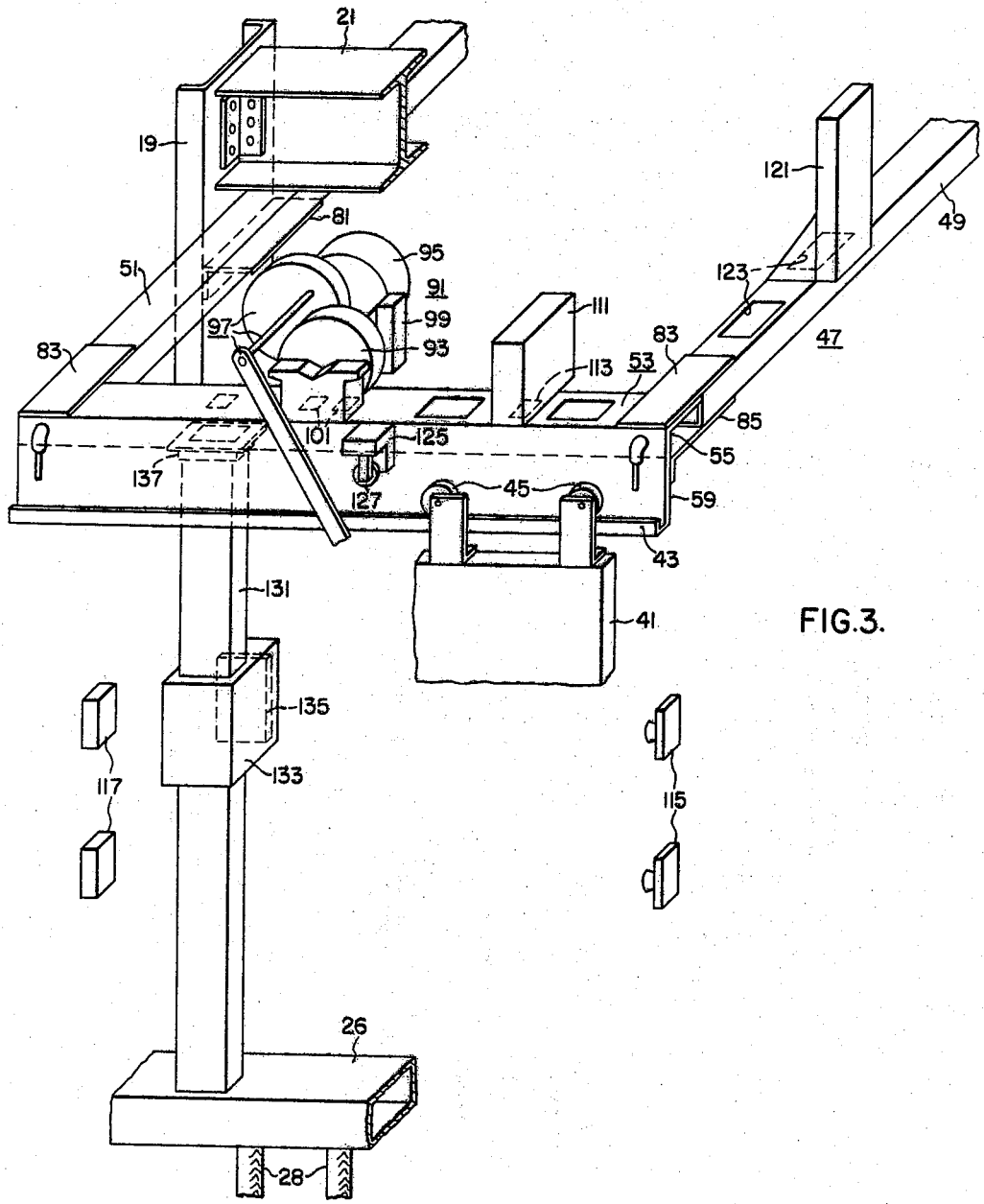
FIG. 3 is a view in perspective of an elevator car showing the important features of this invention in one of its aspects.

FIGS. 1, 2 and 3 show an elevator car 11 including a supporting framework and a passenger cab 12. This framework is composed of channels 13 and 15, usually called "safety channels," extending along the lower center of the car 11 bolted to vertical channels or stiles 17 and 19. An I-beam 21 (which may also be a channel or similar structure) is bolted near the upper ends of the stiles 17 and 19; this I-beam 21 is referred to as a cross I-beam. Angles 20 and 22 are secured to the safety channels 13 and 15 at both ends of the cab. Each angle 20, 22 extends along the depth dimension of the cab perpendicular to the door opening. The passenger cab 12 is supported on rubber pads 23 from the structural beams 13, 15, 17, 19 of the framework. The upper surfaces of the horizontal legs of angles 20 and 22 support the lower rubber pads 23. The lower surface of these legs of the angles 20 and 22 support a junction box 26 into which the power supply cable 28 for the car 11 terminate and from which power supply conductors for the control, operating and service components of the car extend. In some installations the junction box is mounted on the cab platform. The pads 23 prevent noise and mechanical vibrations of the other portion of the car 11 from penetrating into the passenger cab 12. The pads 23 permit slight movement and vibration of the passenger cab 12 relative to the framework. The upper flange of the I-beam 21 of the framework is connected to cables 25 which are in turn connected to the driving mechanism (not shown) of the car usually located in the penthouse of the elevator.

The cab 12 is closed by a door 41 which is supported on a track 43. The door 41 is provided with rollers 45 which engage the track 43 on which the door 41 is movable. In accordance with this invention the track 43 and the door 41, which the track carries, are supported from a U-shaped duct assembly 47 through which pass the wires from the car-junction box 26 and the control, operating and service components. This U-shaped assembly includes side ducts 49 and 51 and a front or transverse duct 53.

The transverse duct 53 may be formed from elongated angles 55 and 57 of sheet metal. The angle 55 which forms the top and front sides of duct 53 is, in accordance with an aspect of this invention of substantially thicker material than the other angle 57 and the front leg of this angle is longer than the top leg. The angles 55 and 57 are placed with the rear leg of angle 57 abutting the rear of the top leg of angle 55 and the bottom leg of angle 57 abutting the front leg of angle 55 with a lip 59 extending below the point of abutment. The angles are formed into a rigid enclosure of rectangular section by welding the legs at the point of abutment.

Figure 7:
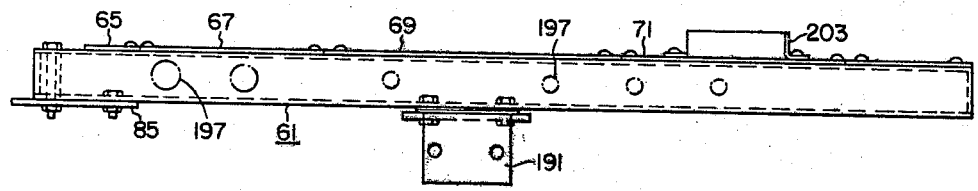
FIG. 7 is a view in side elevation of a typical duct of this structure.
Figure 4:
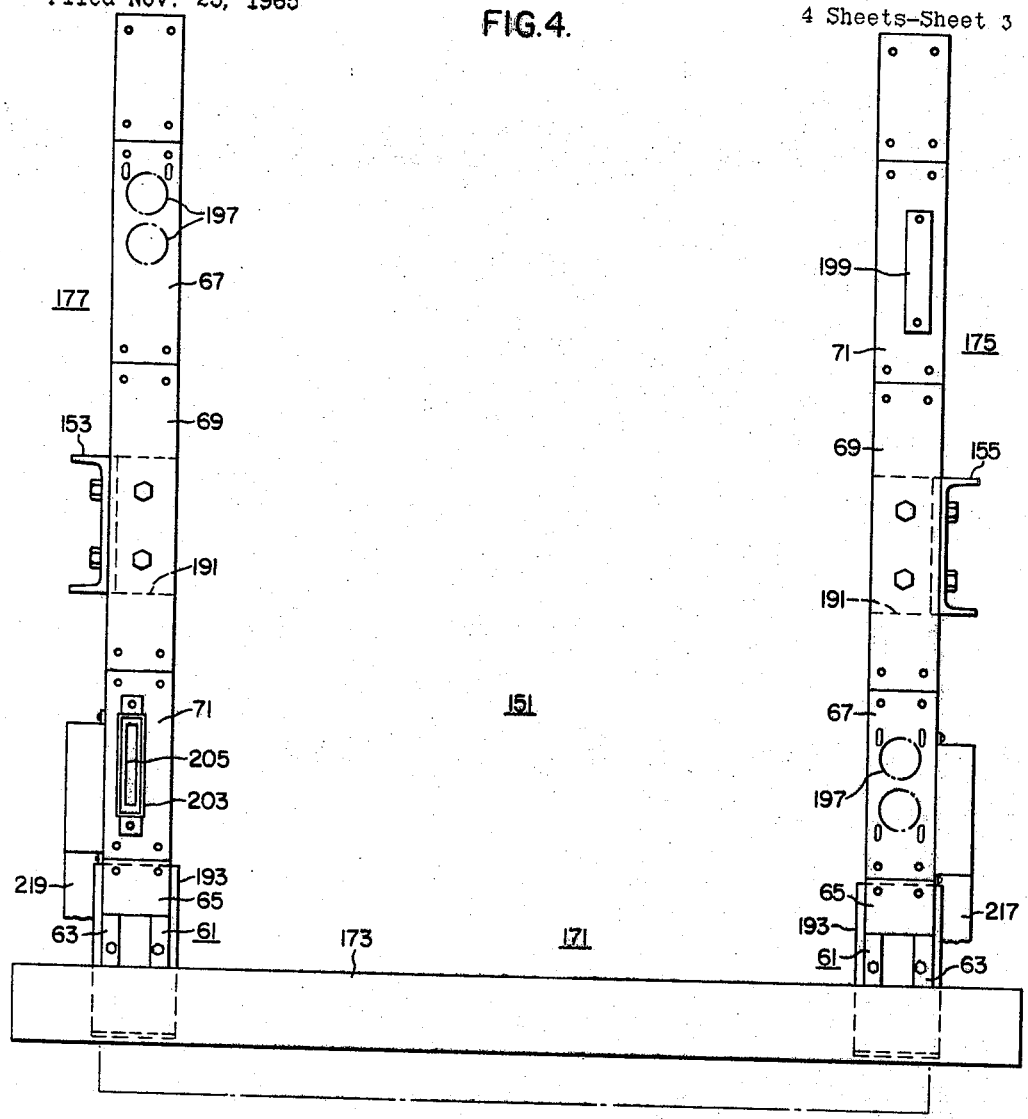
FIG. 4 is a plan view of the door supporting structure of an elevator car in accordance with this invention in another of its aspects.
Figure 8:
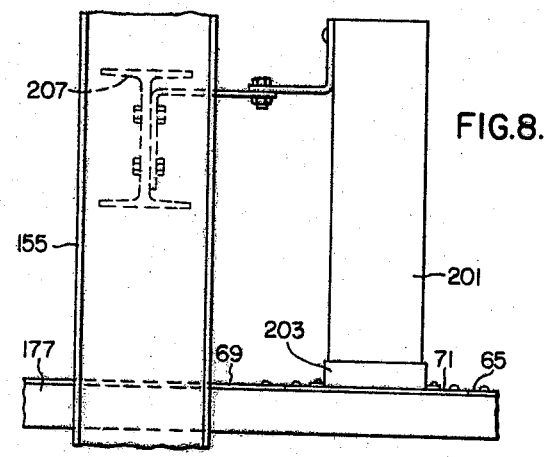
FIG. 8 is a fragmentary view showing the manner in which the inductor of an elevator with a gearless drive is mounted on one of the side ducts of the structure shown in FIG. 4.

The side ducts 49 and 51 may be formed, in the same way as the transverse duct 53, by abutting the legs of angles forming respectively the top and one side and the bottom and the other side of each duct and welding the legs at the point of abutment. They may also be formed, as shown in FIGS. 4 and 7, from a dish-shaped channel 61 of sheet metal having lips 63 to which plates 65, 67, 69 and 71 are secured.

The side ducts of the U-shaped duct assembly 47 are supported from the stiles 19 by angles 81. The track 43 and door 41 are supported from the lip 59 of the transverse duct 53.

The side ducts 49 and 51 abut the transverse duct 53 near its ends about side openings (not shown) in the transverse duct 53, and are thus in communication with the transverse duct. The side ducts 49 and 51 are provided at their front ends with upper and lower plates 83 and 85 between which the transverse duct is secured with the ends of the side ducts in abutment and communication.

The duct assembly 47 supports the control, operating and servicing components of the car. Typically the transverse duct 53 supports the door-operating assembly 91 including a supporting casting 93, a door-operating motor 95, a linkage 97 connected to the door 41 and a box 99 containing a maintenance switch and light (now shown). The casting 93 is hollow and communicates with the duct 53 through knockouts 101 through which the wires to the motor 95 and box 99 pass. The heavier material of the top and front of angle 55 is adequate to support the door-operating assembly 91. A box 111 containing the circuit of the TRAFFIC SENTINEL apparatus is also mounted on the transverse duct 53. This box 111 is connected through knockouts 113 in the duct 53 to the sender and receiver components 115 and 117 in the cab of this apparatus.

The side duct 49 carries a box 121 which typically contains the slowdown switch, leveling switch or landing switch. This box 121 is connected through knockouts 123 with the duct 49 and the wires from the car-junction box 26 to the switches pass through these knockouts 123. A box 125 including the door release (not shown) is supported from the front wall of the transverse duct 53 in a position in which the door-release switching mechanism 127 is actuable by the door 41. Other boxes or components may be mounted on the duct system 47 as necessary.

The car 11 includes an additional duct 131 which is vertical and extends between the car-junction box 26 to the transverse duct 53. This duct 131 includes the car station 133 and has a panel 135 which includes the pushbuttons and other controlling mechanisms (not shown) of the car station. The lower portion of the duct 131 is secured to the floor of the cab 12 and is in communication with the car-junction box 26 and transmits the necessary wires from the car-junction box 26 to the car station and thence through a flanged opening 137 to the transverse duct 53. The additional duct 131 is not secured to the transverse duct at this opening 137 but is movable relative thereto so that it may move with the cab 12 as the cab moves slightly on the pads 23.

The ducts including the U-shaped duct assembly 47 and the additional duct 131 may be constructed as a unit with the wires extending through the ducts and with the operator 91 and boxes 111, 121 and 127 mounted on the ducts as disclosed in FIGS. 1 through 3. The transmitters 115 and receivers 117 may extend from this unit or their wires may be in separate short ducts. This unit may then be mounted in the car as disclosed. The advantage of this arrangement is that the various boxes and parts are installed in positions which are most convenient for the use of the car.

The apparatus shown in FIGS. 4 through 8 includes a car 151 having a framework of beams similar to the car shown in FIGS. 1 through 3. This framework includes channel-shaped stiles 153 and 155 centrally disposed along the car. The car also includes a door 157 movable on rollers 159 on a track 161.

The car 151 includes a U-shaped duct assembly 171 having a transverse duct 173 and side ducts 175 and 177. The transverse duct is formed as in the apparatus shown in FIGS. 1, 2 and 3 of sheets formed into angles 179 and 181 with the ends of the legs of angles 179 and 181 abutting and welded at rear and the leg of angles 181 abutting leg of angle 179 to form lip 183. The angle 179 is composed of thicker material, typically .109 inch, and the angle 181 of .075 inch. The door is supported from lip 183 to which the track 161 is secured.

Te side ducts 175 and 177 are composed as described above of a trough 61 with bent-over lips 63 to which plates are secured. The side ducts 175 and 177 abut the transverse duct 173 and are in communication. The side ducts 175 and 177 are mounted on angles 191 secured to the stiles 155. The transverse duct 173 is mechanically secured to the side ducts 175 and 177 by plates 193.

The ducts 173, 175 and 177 support operating, servicing and control components similarly to those shown in FIGS. 1 through 3 and have knockouts 197 and removable plates 199 for connecting to wires passing through the ducts. Typically the inductor 201 for use with gearless drives may be mounted on side duct 177. The inductor is seated in a rectangular collar 203 welded around an opening 205 in the duct and is braced to the I-beam 207 of the framework of the car 151.

The car 151 includes a junction box 211 supported from the lower horizontal surfaces of angles (not shown) bolted to the safety channels (not shown) as in the car shown in FIGS. 1 through 3 or is mounted on the cab platform. The junction box 211 is in communication with a car station 213 through an additional duct 215 supporting the car station. The junction box 211 is also in communication with the side ducts 175 and 177 through additional ducts 217 and 219 which are appropriately mounted on the outside of the car.

The aspect of this invention shown in FIGS. 4 through 7 differs from the aspect shown in FIGS. 1 through 3 in that the car-station structure does not lend itself to the provision of a communication duct within the passenger cab between the junction box and the transverse duct. Like the apparatus shown in FIGS. 1 through 3 the duct assembly may be manufactured separately and installed on the car 151 in the building in which the elevator is installed. The cost of producing this duct assembly and preplacing the components at the manufacturing site is substantially lower than the cost of providing similar connections in the building where the elevator is being installed.

While preferred embodiments of this invention have been disclosed herein, many modifications thereof are feasible. This invention then is not to be restricted except insofar as it is necessitated by the spirit of the prior art.

We claim as our invention:

1. A vehicle including a frame, and a cab mounted on said frame and having a doorway, a duct assembly secured to said frame independently of said cab, a door movable between open and closed positions supported from said vehicle, said vehicle including electrical junction means movable with said vehicle for supplying power, said vehicle also including servicing, operating and controlling components for said vehicle at different positions of said vehicle, said door being supported from said duct assembly supported by said vehicle, and electrical conductors within said duct assembly connected in current-conducting relationship between said junction means and said components.

2. The vehicle of claim 1 wherein the door includes an operating mechanism including a motor and a driving connection between said motor and said door and wherein said operating mechanism is both supported from the duct assembly together with the door independently of said cab and supplied with electrical current through conductors within said duct assembly.

3. The vehicle of claim 1 wherein the duct assembly includes side ducts extending generally perpendicular to the door and supported from the frame and a transverse duct supported by said side ducts; and wherein the door is supported by said transverse duct, said transverse duct being of generally rectangular section having two adjacent walls from which said door is supported, said two walls being of substantially thicker material than the remaining walls of said transverse duct.

4. A vehicle including a door movable between open and closed positions supported from said vehicle, said vehicle including electrical junction means movable with said vehicle for supplying power, said vehicle also including servicing, operating and controlling components for said vehicle at different positions of said vehicle, said door being supported from ducts supported by said vehicle, and electrical conductors within said ducts connected in current-conducting relationship between said junction means and said components, the vehicle including a supporting frame and a cab, said cab being resiliently supported from said frame and the cab having a car station, said car station being supported on an additional duct in said cab in communication with the ducts supporting the door, said additional duct having therein electrical conductors for conducting current to said station and also connected to the conductors in the supporting duct, said additional duct being movable relative to the supporting duct.

5. The vehicle of claim 4 wherein the car station is mounted directly on the additional duct and is electrically connected to conductors passing through openings in the additional duct and station.

6. The vehicle of claim 4 wherein the conductors between the supporting ducts and the junction are contained within the additional duct.

7. The vehicle of claim 1 wherein the control means includes a plurality of components in containers and wherein the containers are mounted directly on the supporting duct assembly and are electrically connected to conductors which pass through openings in the duct assembly and containers.

References Cited

UNITED STATES PATENTS

| | | | |
|---|---|---|---|
| 1,810,960 | 6/1931 | Hall | 187—1 |
| 2,246,732 | 6/1941 | Hymans | 187—1 |
| 2,319,287 | 5/1943 | Arendt | 187—1 |
| 2,996,152 | 8/1961 | Olexson | 187—52 |

EVON C. BLUNK, *Primary Examiner.*

H. C. HORNSBY, *Assistant Examiner.*